(12) United States Patent
Macelloni

(10) Patent No.: US 10,808,931 B2
(45) Date of Patent: Oct. 20, 2020

(54) THERMOINSULATING TILE FOR A COMBUSTION CHAMBER OF A GAS TURBINE

(71) Applicant: ANSALDO ENERGIA S.p.A., Genoa (IT)

(72) Inventor: Paolo Macelloni, Genoa (IT)

(73) Assignee: ANSALDO ENERGIA S.P.A., Genoa (IT)

( * ) Notice: Subject to any disclaimer, the term of this patent is extended or adjusted under 35 U.S.C. 154(b) by 327 days.

(21) Appl. No.: 15/852,520

(22) Filed: Dec. 22, 2017

(65) Prior Publication Data
US 2018/0179958 A1     Jun. 28, 2018

(30) Foreign Application Priority Data

Dec. 23, 2016    (IT) .......................... 102016000130851

(51) Int. Cl.
*F23R 3/00*     (2006.01)
*F23R 3/02*     (2006.01)

(52) U.S. Cl.
CPC .............. *F23R 3/007* (2013.01); *F23R 3/002* (2013.01); *F23R 3/02* (2013.01); *F23R 2900/00019* (2013.01); *Y10T 428/166* (2015.01)

(58) Field of Classification Search
CPC ............. Y10T 428/239; Y10T 428/234; Y10T 428/16; Y10T 428/166; F23R 2900/00019; F23R 3/002; F23R 3/007; F05D 2260/80
See application file for complete search history.

(56) References Cited

U.S. PATENT DOCUMENTS

| 3,797,896 A | * | 3/1974 | Bardach | ................... F16C 17/24 |
| | | | | 384/8 |
| 4,604,604 A | * | 8/1986 | Mann | ...................... F16D 66/02 |
| | | | | 116/206 |
| 4,838,030 A | | 6/1989 | Cramer | |
| 5,451,110 A | * | 9/1995 | Gams, Jr. | .................. B02C 2/06 |
| | | | | 116/208 |
| 5,965,266 A | * | 10/1999 | Goujard | ................ C04B 35/806 |
| | | | | 427/228 |

(Continued)

FOREIGN PATENT DOCUMENTS

| CN | 105324611 A | 2/2016 |
| EP | 2 698 503 A1 | 2/2014 |
| GB | 2 455 850 A | 6/2009 |

OTHER PUBLICATIONS

Wataru Nakao, "Second Step Approach for Self Healing Ceramics," Materials Science Forum vols. 638-642 (2010) pp. 2133-2137. (Year: 2010).*

(Continued)

*Primary Examiner* — William H Rodriguez
*Assistant Examiner* — David P. Olynick
(74) *Attorney, Agent, or Firm* — Buchanan Ingersoll & Rooney PC

(57) ABSTRACT

A thermoinsulating tile for combustion chambers of gas turbines comprises:
a thermoinsulating material body having a first face and a second face; a sealed chamber encapsulated in the thermoinsulating material body between the first face and the second face and containing a marker substance in the liquid state at least at a temperature of use of the thermoinsulating tile.

13 Claims, 4 Drawing Sheets

(56) References Cited

U.S. PATENT DOCUMENTS

| | | | |
|---|---|---|---|
| 6,974,641 B1* | 12/2005 | Choy | C23C 30/00 |
| | | | 250/361 R |
| 9,926,238 B2* | 3/2018 | Louchet | C04B 41/4527 |
| 2005/0241148 A1 | 11/2005 | Vance | |
| 2006/0169180 A1* | 8/2006 | Dry | C04B 22/006 |
| | | | 106/711 |
| 2006/0177665 A1 | 8/2006 | Bast et al. | |
| 2008/0131699 A1 | 6/2008 | Vance | |
| 2009/0162533 A1* | 6/2009 | Kirby | C23C 30/00 |
| | | | 427/8 |
| 2012/0167664 A1 | 7/2012 | Krishna et al. | |
| 2013/0019603 A1* | 1/2013 | Dierberger | F23R 3/002 |
| | | | 60/772 |
| 2015/0204207 A1 | 7/2015 | Bulat et al. | |
| 2015/0241309 A1* | 8/2015 | Cheung | G01M 15/14 |
| | | | 73/112.01 |
| 2016/0003063 A1* | 1/2016 | Rosenzweig | F01D 9/041 |
| | | | 427/397.7 |
| 2016/0109129 A1 | 4/2016 | Rettig | |

OTHER PUBLICATIONS

J.Y. Fan, X.L. Wu, Paul K. Chu, "Low-dimensional SiC nanostructures: Fabrication, luminescence, and electrical properties," Progress in Materials Science 51 (2006) 983-1031 (Year: 2006).*
*Italian Search Report dated Sep. 14, 2017.
Third Office Action dated Jun. 1, 2020, by the Chinese Patent Office in corresponding Chinese Patent Application No. 201711406727.X, and an English Translation of the Office Action. (14 pages).

* cited by examiner

THERMOINSULATING TILE FOR A COMBUSTION CHAMBER OF A GAS TURBINE

PRIORITY CLAIM

This application claims priority from Italian Patent Application No. 102016000130851 filed on Dec. 23, 2016, the disclosure of which is incorporated by reference.

TECHNICAL FIELD

The invention relates to a thermoinsulating tile for combustion chambers of gas turbines.

BACKGROUND OF THE INVENTION

As it is known, the combustion chamber of gas turbines must be provided with an inner thermoinsulating coating, due to the high temperatures developing during the operation thereof. The thermoinsulating coating usually consists of a plurality of tiles arranged in contiguous rows on the inner walls of the casing of the combustion chamber, so as to define a substantially continuous surface.

The thermoinsulating tiles, when possible, are made of a refractory ceramic material, which offers better performances in terms of thermal insulation and of mean lifetime compared to thermal shields made of a metal alloy. Furthermore, ceramic material tiles require a smaller cooling air flow rate than thermal shields made of a metal alloy.

However, ceramic material tiles may deteriorate and be subjected to breaks due to the harsh environment with which they come into contact during the operation of the machine. In particular, high temperatures ranging from 1200° C. to 1600° C., temperature ranges and vibrations caused by balancing problems or by thermoacoustic oscillations may cause cracks that, by expanding, may jeopardize the integrity of the tile. On the one hand, the thermal protection function of the tile is degraded, with possible structural risks for the casing of the combustion chamber. On the other hand, following a break, portions of tile may get into the flow of exhaust gases and cause very serious damages to the turbine, Therefore, the tiles must be inspected periodically and even when certain combustion faults occur that may lead to particularly serious risks. The inspection of the integrity of the thermal shield is carried out in a visual manner by an operator who, by personally getting into the combustion chamber or with the aid of image capturing systems, examines the state of each tile, looking for possible fissures and/or cracks. The identification of cracks through visual inspection of through the examination of images, though, is far from simple. Therefore, the time needed for a careful analysis is long. Nevertheless, there still is an actual possibility of missing some lesions during the inspection.

SUMMARY OF THE INVENTION

Hence, the object of the invention is to provide a thermoinsulating tile for a combustion chamber of a gas turbine, which allows manufacturers to overcome or at least reduce the limitations described above.

According to the invention, there is provided a thermoinsulating tile for combustion chambers of gas turbines, comprising:

a thermoinsulating material body having a first face and a second face;

a sealed chamber encapsulated in the thermoinsulating material body between the first face and the second face and containing a marker substance in the liquid state at least at a temperature of use of the tile.

Due to possible thermal-mechanical stresses occurring during the operation, the thermoinsulating tile may be damaged. A typical damage consists of a crack that is triggered off, usually on the edges, and propagates towards the inside of the thermoinsulating material body. It is usually hard to identify a crack even after a careful inspection. The marker substance contained in the chamber, instead, is liquid at the temperature of use of the tile and penetrates the crack as soon as the chamber is reached. By flowing out of the surface, the marker substance leaves an evident mark, which can easily be detected.

Based on the type of marker substance used, the detection may be optical, through direct inspection or through image capturing and processing systems, or suitable detectors may be used. For example, the marker substance may contain lightly radioactive element which, without being a danger to personnel or to the environment, may easily be detected by a radiation detector. In case of optical detection of luminescent substances, lighting sources may be used, which have a specific spectrum of emission, for example in the ultraviolet range or with a band selected in the visible range.

In any case, damaged tiles can be identified quickly and with a high degree of reliability during a normal inspection of the combustion chamber, to the advantage both of maintenance costs and of the safety of the plant.

According to an aspect of the invention, the marker substance has at least one component with a melting temperature lower than 1000° C.

The melting temperature ensures that the marker substance is in the liquid state at the temperature of use of the tile.

According to an aspect of the invention, the marker substance contains a metal alloy with melting temperature lower than 1000° C. and powder of silicon carbide.

According to an aspect of the invention, the marker substance contains a dye.

According to an aspect of the invention, the marker substance contains a luminescent substance.

According to an aspect of the invention, the marker substance contains radioactive elements.

According to an aspect of the invention, the thermoinsulating material body has a thickness defined by a distance between the first face and the second face and the chamber has a height between one quarter and three quarters of the thickness of the thermoinsulating material body.

The chamber, which is manufactured with the indicated proportions, can contain a sufficient quantity of marker substance without significantly decreasing the thermal-mechanical resistance of the tile.

According to an aspect of the invention, the chamber contains a repairing substance, which is at the liquid state inside the chamber at least at the temperature of use of the tile and solidifies in contact with an environment inside the combustion chamber.

The repairing substance penetrates the cracks together with the marker substance and, in contact with the environment present inside the combustion chamber, solidifies. By so doing, the propagation of the crack is stopped and the risk of break before the replacement of the tile is reduced.

According to an aspect of the invention, the marker substance contains aluminium.

The melted aluminium, by flowing out of the chamber through a crack, oxidizes in contact with the environment of the combustion chamber, thus forming alumina, which is similar to the material of the thermoinsulating tiles and tends to alloy stabilizing the lesions.

According to an aspect of the invention, the thermoinsulating tile comprises a plurality of sealed chambers encapsulated in the thermoinsulating material body between the first face and the second face and containing the respective marker substance.

According to an aspect of the invention, the chambers are separated by walls of thermoinsulating material, which define stiffening ribs.

By so doing, the thermal-mechanical resistance is further improved without remarkably reducing the quantity of marker substance available.

According to an aspect of the invention, there is further provided a combustion chamber of a gas turbine, comprising a thermoinsulating coating having at least a thermoinsulating tile according to any one of the foregoing claims.

According to an aspect of the invention, the combustion chamber comprises a plurality of thermoinsulating tiles arranged in a region where a risk of damage of the thermoinsulating tiles is statistically greater.

BRIEF DESCRIPTION OF THE DRAWINGS

The invention will now be described with reference to the accompanying drawings, which show a non-limiting embodiment thereof, wherein.

DETAILED DESCRIPTION OF THE INVENTION

Figure 1:
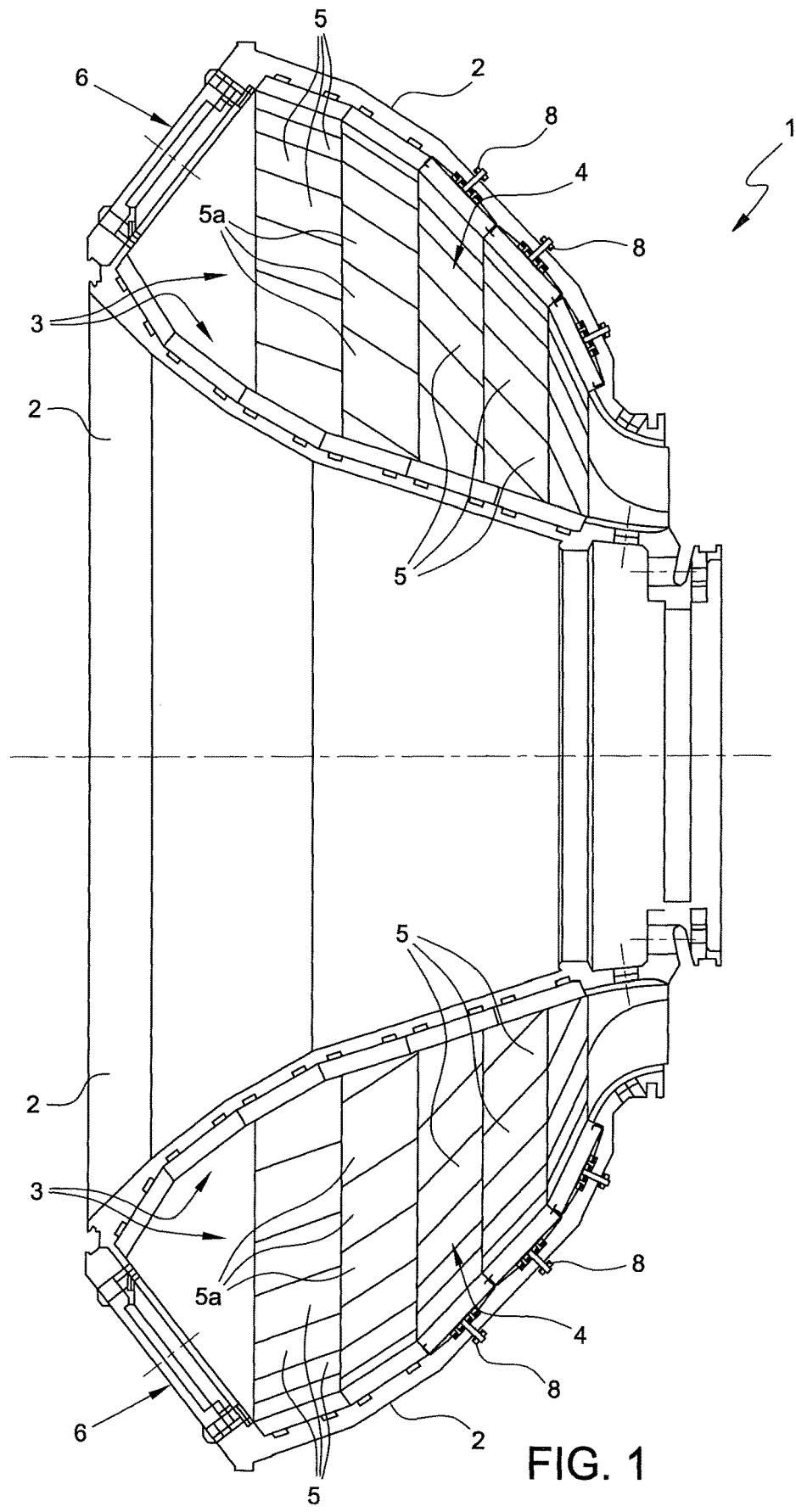
FIG. 1 is a side view, with a cross section along an axial plane and with parts removed for greater clarity, of an annular combustion chamber of a gas turbine.
Figure 2:
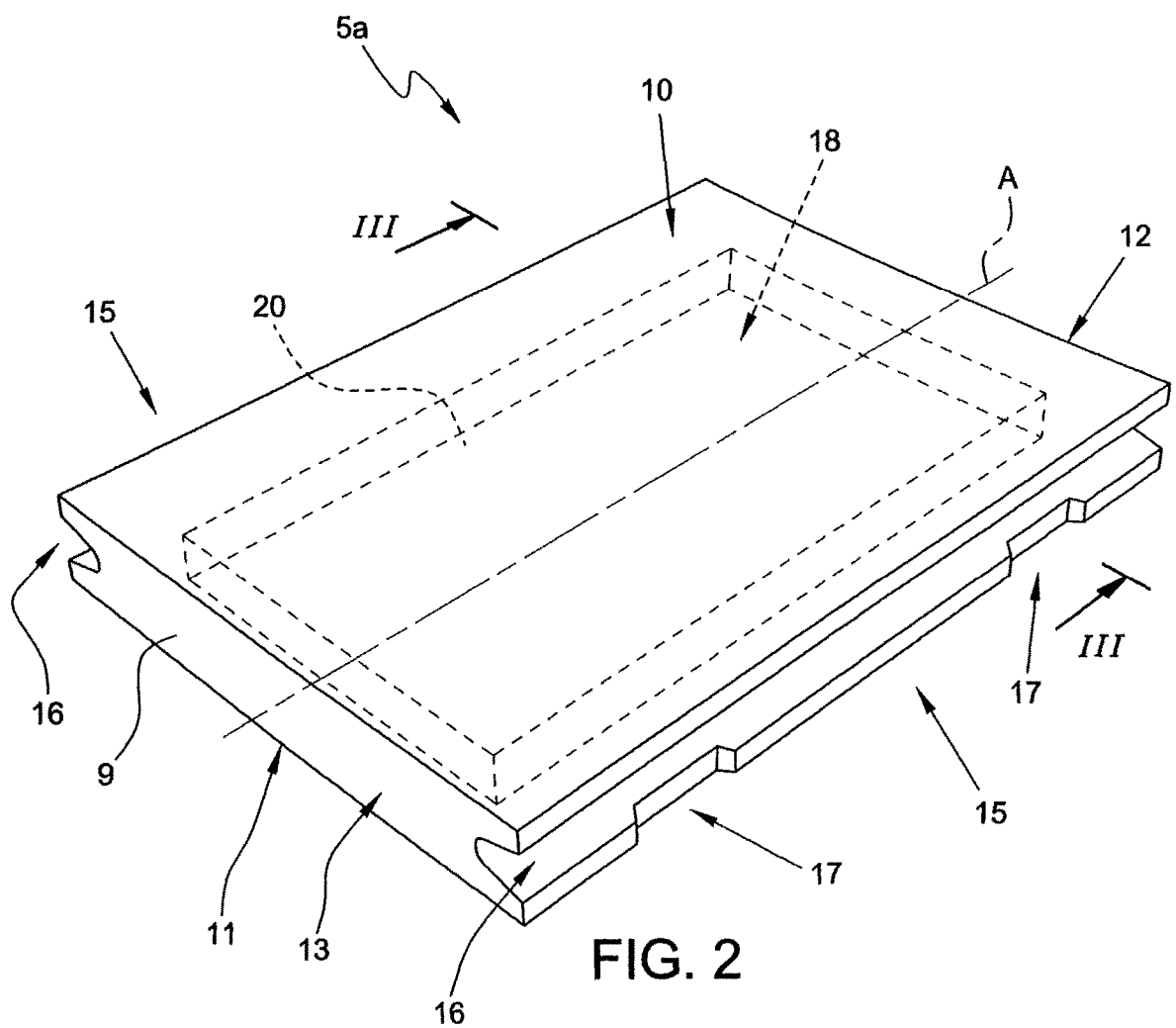
FIG. 2 is a perspective view from the front of a thermoinsulating tile according to an embodiment of the invention, in a first condition.
Figure 3:
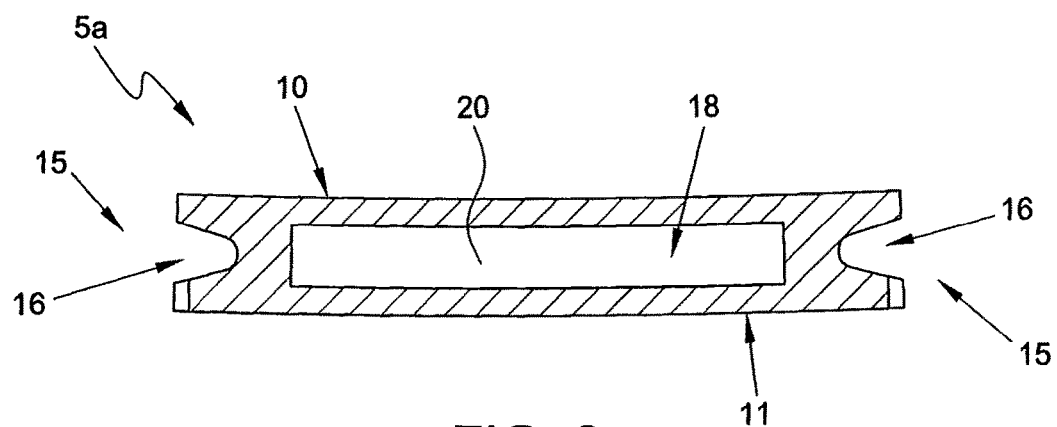
FIG. 3 is a front view of the thermoinsulating tile of FIG. 2, with a cross section along plane III-III of FIG. 2.

FIG. 1 shows a combustion chamber 1 of a gas turbine (not shown entirely). The combustion chamber 1 comprises an annular casing 2 extending around an axis and is provided with a thermoinsulating coating 3, which covers the casing 2 on the inside and delimits a combustion volume 4. FIG. 1 also shows housings 6 for burners, which are not shown for the sake of simplicity.

The thermoinsulating coating 3 comprises a plurality of thermoinsulating tiles 5, which are made of a refractory material and are arranged in adjacent rows along circumferences around the axis of the combustion chamber 1. Optionally, the thermoinsulating coating 3 may also comprise rows of metal thermoinsulating shields, in particular in the portions of the combustion chamber adjacent to the exhaust, which are less hot.

The thermoinsulating tiles 5 are fixed to the casing 2 by anchorages 8. Any known anchoring system that is suited to hold the tiles fixed to the casing 2 may be used to this purpose.

In a region of the combustion chamber 1 that is statistically subjected to a greater damage risk, the thermoinsulating coating 3 comprises control thermoinsulating tiles, indicated with 5a, which—in an embodiment have the same shape as the other thermoinsulating tiles 5. The region where it is most useful to place the control thermoinsulating tiles 5a may be conveniently determined through simulations, experiments or analysis of data collected from operating machines. Furthermore, all the thermoinsulating tiles used may be control thermoinsulating tiles.

One of the thermoinsulating tiles 5a of the thermoinsulating coating 3 is shown in detail in FIGS. 2-5. The features described below, if not explicitly mentioned otherwise, are generally applied to all the thermoinsulating tiles 5a of the thermoinsulating coating 3.

The thermoinsulating tile 5a comprises a thermoinsulating material body 9, which has a substantially quadrangular shape and has a first face or hot face 10 (FIGS. 2 and 3), which faces the combustion volume 4, and a second face or cold face 11 (FIGS. 3 and 4), which is opposite the hot face 10 and is oriented towards the casing 2. The hot face 10 and the cold face 11 may be lightly curved, respectively concave and convex or respectively convex and concave, based on the distance of the axis from the combustion chamber 1 and on the positioning on the radially outer portion or on the radially inner portion of the casing 2. The thermoinsulating tile 5a further has a first side 12, which is arranged upstream relative to a gas flowing direction in the combustion chamber 1, and a second side 13 downstream of the first side 12. Flanks 15 extend between the hot face 10 and the cold face 11 and between the first side 12 and the second side 13. The thermoinsulating tile 5 is substantially symmetrical relative to a longitudinal middle axis A (FIG. 2), wherein by longitudinal the direction is meant that goes from the first side 12 to the second side 13, perpendicularly to them.

The thermoinsulating tile 5a (FIGS. 2-4) has grooves 16 along the flanks 15 and anchoring seats 17 for coupling to respective anchorages 8. The shape of the flanks of the thermoinsulating tile 5a basically depends on the type of anchoring system used and may change according to individual cases.

A sealed chamber 18 is encapsulated in the thermoinsulating material body 9 between the hot face 10 and the cold face 11. The chamber 18 has, for example, a height H ranging from one third to two thirds of the thickness T of the thermoinsulating material body 9, which is defined by a distance between the hot face 10 and the cold face 11. Depending on the specific operating conditions, the height H of the chamber 18 may range from one quarter to three quarters of the distance between the hot face 10 and the cold face 11. In particular, in some machines that do not require extreme operating conditions or in the presence of tiles made of special materials with a high mechanical resistance, a greater height of the chamber (and, as a consequence, a smaller thickness of the tiles) may be tolerated without jeopardizing the structural integrity of the tiles. In an embodiment, the chamber 18 is arranged at the centre relative to the thermoinsulating material body 9.

The chamber 18 contains a marker substance 20 having at least one component which is in the liquid state at least at a temperature of use of the tile. By temperature of use a temperature is meant that is established on the inside of the thermoinsulating material body 9 and, more precisely, on the inside of the chamber 18 during the operation of the machine, if necessary with the exception of a starting transient.

Advantageously, the marker substance 20 has at least one component with a melting temperature lower than 1000° C.

Temperatures within the indicated threshold include the normal temperatures of use of the tiles. In these conditions, the marker substance 20 can flow, through capillarity, through interstices with a very small width, such as cracks in the thermoinsulating tile 5a.

The marker substance 20 is a substance that is capable of leaving a permanent mark on a body with which the marker substance 20 itself comes into contact, in particular in case of a porous material like the body 9.

For example, in an embodiment, the marker substance 20 may contain a pigment or a dye, which impregnates the surface of the body 9 with which it comes into contact. In a different embodiment, the marker substance 20 may contain a luminescent substance. In a further embodiment, the marker substance 20 may contain radioactive elements.

For example, the marker substance 20 may comprise a mixture of silicon carbide powders, which remain in the solid state due to the high melting temperature (above 2000° C.), and an alloy with a melting temperature below 1000° C. For example, the marker substance 20 may comprise low-melting alloys, like tin or aluminium alloys, which have a melting temperature below 250° C. At the operating temperatures of the gas turbine, the low-melting alloy is in the liquid state and can flow, through capillarity, through the smallest cracks extending up to the chamber 18. The liquid low-melting alloy, by flowing out of the chamber 18, carries with it the silicon carbide powders, which have dark colour, up to the surface of the thermoinsulating tile 5a, where the optical detection can easily be carried out. The low-melting alloy basically fulfils the function of a carrier and is present in a proportion that is sufficient to ensure the transportation of the silicon carbide powders. For example, the marker substance 20 may contain 20% by weight of low-melting alloy and 80% by weight of silicon carbide powders.

The chamber 18 may also contain a repairing substance, which is mixed with the marker substance. The repairing substance, which is in the liquid state inside the chamber at least at the temperature of use of the thermoinsulating tile 5a, has a composition that is such as to solidify when it comes into contact with the environment present in the combustion chamber.

For example, the marker substance 20 may contain aluminium alloys, which act as repairing substance. The aluminium present in the melted alloys, when it comes into contact with the oxygen-rich environment of the combustion chamber, oxidizes forming alumina ($Al_2O_3$). The alumina is similar to the material making up the thermoinsulating tiles and tends to easily alloy.

Figure 4:
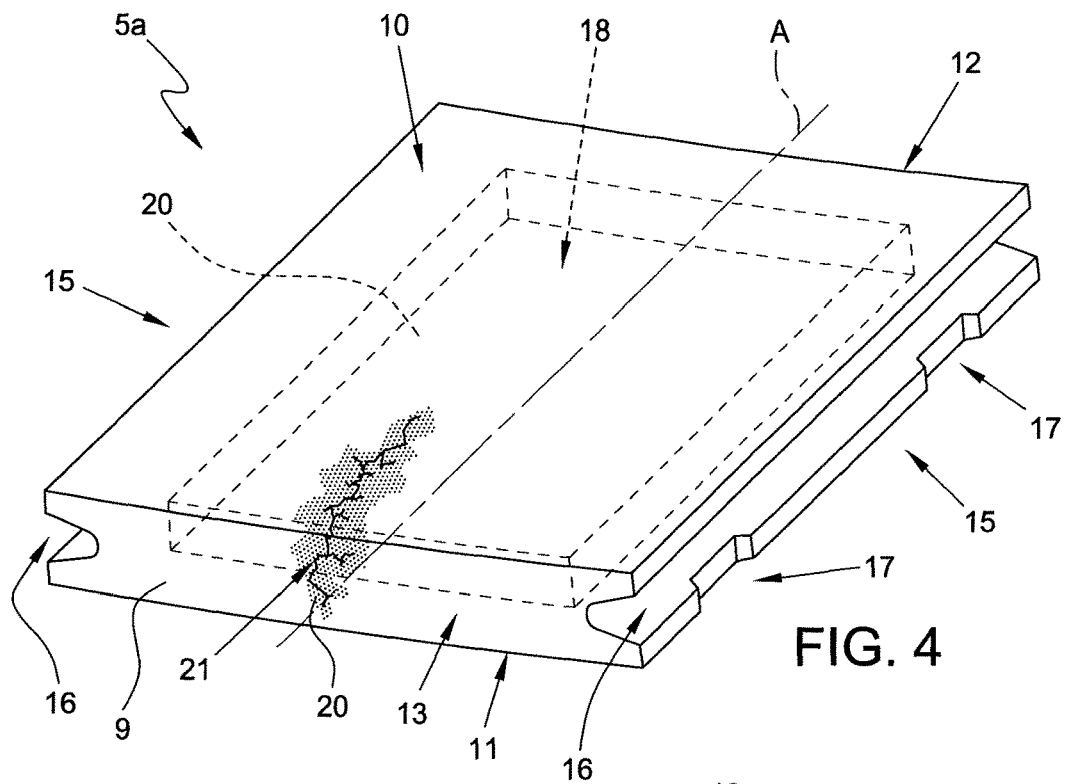
FIG. 4 is a perspective view from the front of the thermoinsulating tile of FIG. 2 in a second condition.
Figure 5:
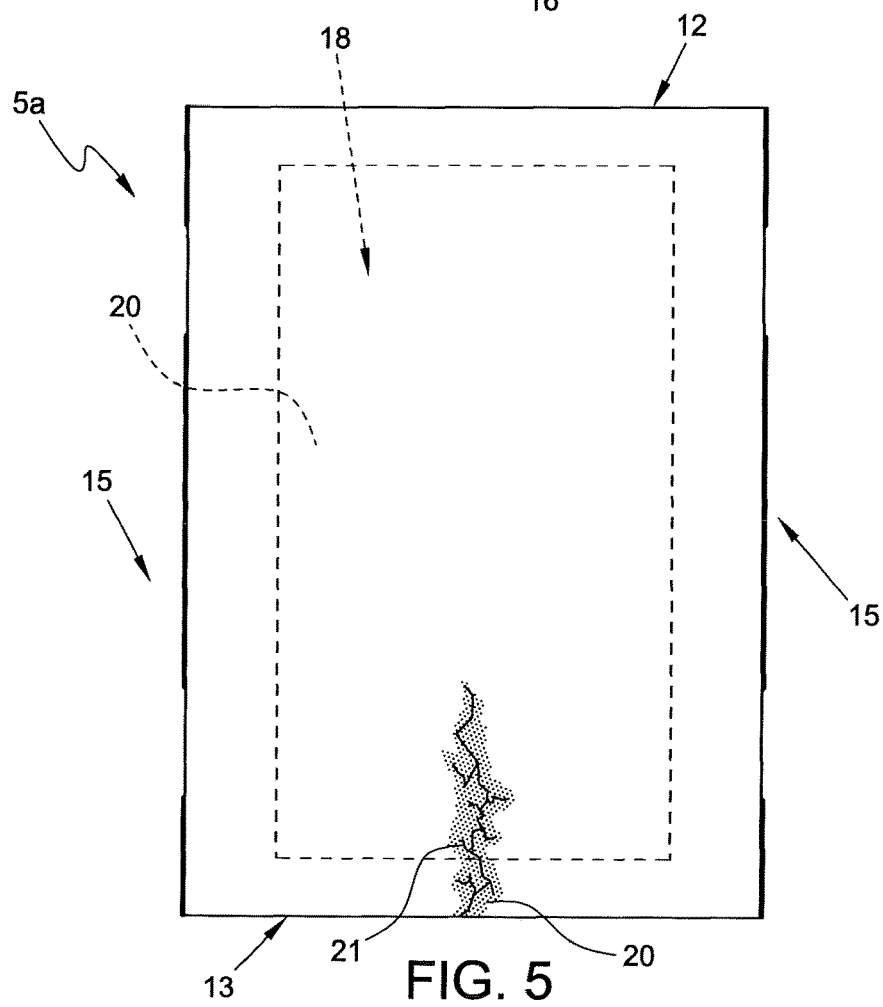
FIG. 5 is a plan view from the above of the thermoinsulating tile of FIG. 2 in the second condition.

Because of the thermal-mechanical stresses arising during the operating of the machine, the thermoinsulating tile 5a may be subjected to the formation of cracks, like the crack 21 shown in FIGS. 4 and 5. The crack 21 may originate from an edge of the thermoinsulating tile 5 and propagate towards the inside, until it reaches the chamber 18. When the walls 18 fissure due to the expansion of the crack 21, the marker substance 20 flows out and reaches the outer surface of the thermoinsulating tile 5a. In particular, since the hot face 10 is more likely to be subjected to thermal stresses, the cracks usually start from the hot face 10 or anyway affect it. The hot face 10, during the inspection phase, may be observed from the inside of the combustion chamber 1, with no need to remove the thermoinsulating tile 5a, and—therefore—operators can easily detect marks of the marker substance 20.

The inspection of the thermoinsulating tiles 5a may be carried out by an operator through direct observation or with the aid of detection tools. Direct observation may be sufficient and, in some cases, easier when the marker substance 20 contains a dye reflecting in the visible range.

Alternatively, especially in case the dye mainly reflects in the ultraviolet range, image capturing and processing tools may be conveniently used in order to search for marks of the marker substance 20. For example, a digital image sensor coupled to a processing unit may be used, which allows not only to display the images detected, but also to manipulate them in order to highlight significant features.

If the marker substance 20 is luminescent, the direct inspection or the inspection carried out with the aid of detection tools can also use a light source with an emission spectrum selected so as to excite the luminescent substance.

If the marker substance 20 contains radioactive elements, a radiation detector can be used.

The repairing substance mixed with the marker substance 20 solidifies upon contact with the environment of the combustion chamber, when it flows out of the chamber 18. The repairing substance seals the crack, thus preventing it from propagating, and—furthermore—improves the mechanical resistance of the damaged thermoinsulating tile 5a, hence reducing the risk of detachment of parts thereof before the next maintenance intervention.

Figure 6:
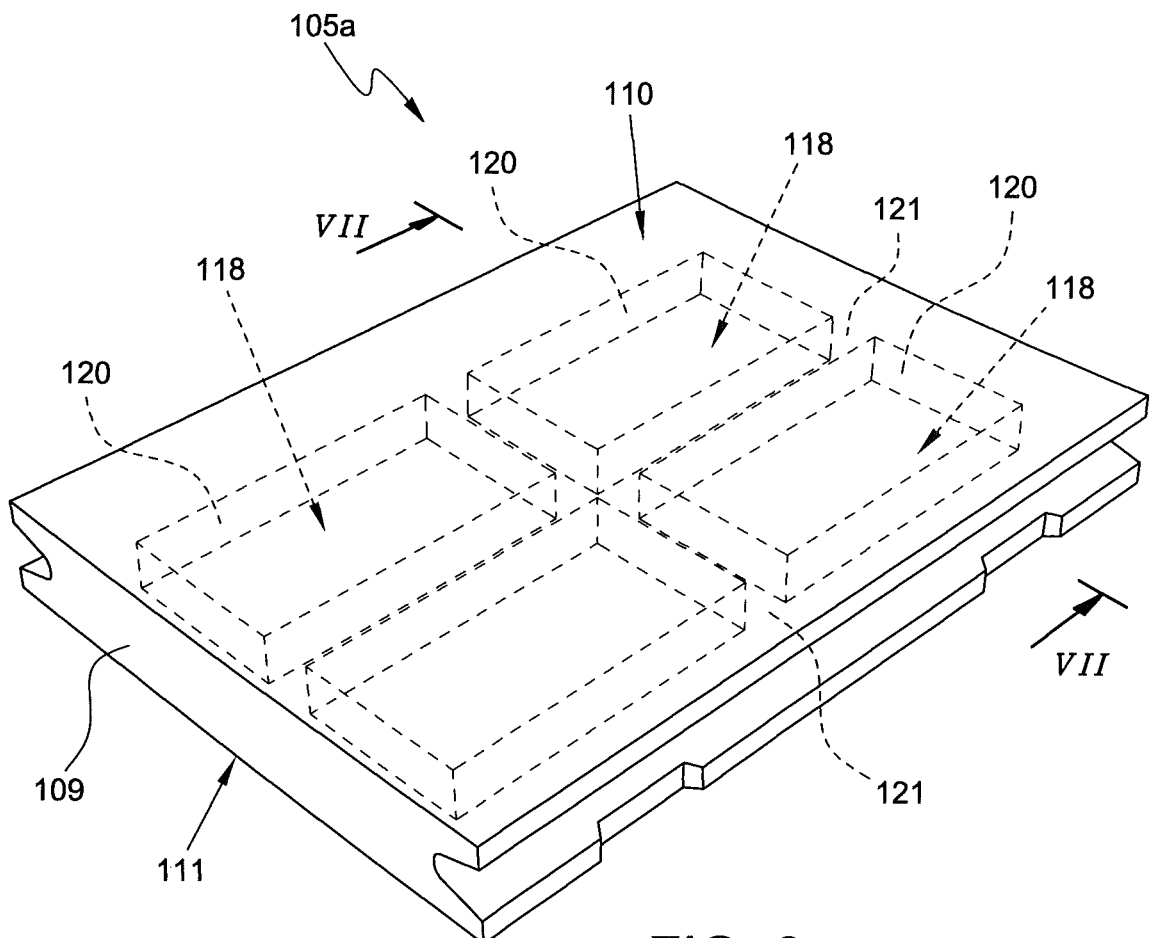
FIG. 6 is a perspective view from the front of a thermoinsulating tile according to a different embodiment of the invention.
Figure 7:
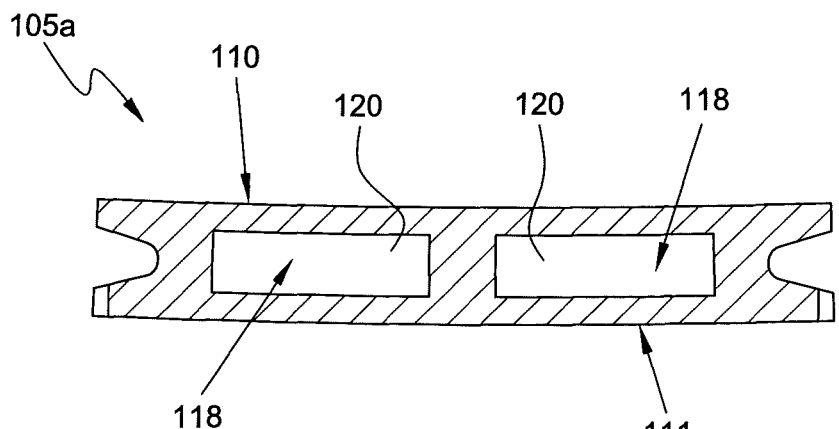
FIG. 7 is a front view of the thermoinsulating tile of FIG. 6, with a cross section along plane VII-VII of FIG. 6.

In the embodiment shown in FIGS. 6 and 7, a tile 105a comprises a body 109, where a plurality of sealed chambers 118 are encapsulated between a hot face 110 and a cold face 111. The chambers 118 contain a marker substance 120 of the type described above, if necessary mixed with a repairing substance. The marker substance 120 may be the same for all chambers 118. Alternatively, each chamber 118 may contain a respective marker substance 120.

In an embodiment, the chambers 118 occupy an approximately parallelepiped-shaped region extending—heightwise—between one third and two thirds of the thickness of the body 109. The chambers 118 are separated by walls 121 of thermoinsulating material, which define stiffening ribs and improve the mechanical resistance of the thermoinsulating tile 105a.

It is evident that the thermoinsulating tile described above can be subjected to changes and variations, without for this reason going beyond the scope of protection of the invention, as set forth in the appended claims.

The invention claimed is:

1. Gas turbine combustion chamber comprising
a thermoinsulating coating having a plurality of thermoinsuiating tiles including first thermoinsulating, tiles and second thermoinsulating tiles wherein a portion of the first thermoinsulating tiles are engaged with a portion of the second thermoinsulating tiles to form the thermoinsulating coating in the gas turbine combustion chamber,
the first thermoinsuiating tiles arranged in a region where a risk of damage of the thermoinsulating tiles is statistically enhanced relative to at least one other region of the combustion chamber due to an operating parameter of temperature or vibration, wherein each first thermoinsulating tile in the region comprises:
a thermoinsulating material body having a first face and a second face:
a sealed chamber encapsulated in the thermoinsulating material body between the first face and the second face and containing a marker substance, the marker substance having at least a component which is in a liquid state at least at a temperature of use of the first thermoinsulating tiles.

2. The gas turbine combustion chamber according to claim 1, wherein the marker substance has a melting temperature lower than 1000° C.

3. The gas turbine combustion chamber according to claim 2, wherein the marker substance contains a metal alloy with melting temperature lower than 1000° C. and powder of silicon carbide.

4. The gas turbine combustion chamber according to claim 3, wherein the marker substance contains 20% by weight of the metal alloy and 80% by weight of the powder of silicon carbide.

5. The gas turbine combustion chamber according to claim 1, wherein the marker substance contains a dye.

6. The gas turbine combustion chamber according to claim 1, wherein the marker substance contains a luminescent substance.

7. The gas turbine combustion chamber according to claim 1, wherein the marker substance contains radioactive elements.

8. The gas turbine combustion chamber according to claim 1, wherein the sealed chamber contains a repairing substance, which is at the liquid state inside the sealed chamber at least at the temperature of use of the first thermoinsulating files and solidifies in contact with an environment inside the combustion chamber.

9. The gas turbine combustion chamber according to claim 8, wherein the marker substance contains aluminium.

10. The gas turbine combustion chamber according to claim 1, wherein the thermoinsulating material body has a thickness (T) defined by a distance between the first face and the second face and the sealed chamber has a height (H) between one quarter and three quarters of the thickness (T) of the thermoinsulating material body.

11. The gas turbine combustion chamber according to claim 1, wherein the sealed chamber is arranged centrally with respect to the thermoinsulating material body.

12. The gas turbine combustion chamber according to claim 1, comprising a plurality of sealed chambers encapsulated in the thermoinsulating material body between the first face and the second face and containing the respective marker substance.

13. The gas turbine combustion chamber according to claim 12, wherein the sealed chambers are separated by walls of thermoinsulating material, which define stiffening ribs.

* * * * *